United States Patent [19]

Bird et al.

[11] Patent Number: 5,429,433
[45] Date of Patent: Jul. 4, 1995

[54] MOLDED REFRIGERATOR SHELF

[75] Inventors: Kevin C. Bird, Holland; Donald C. Gilbert, Muskegon Heights; Robert S. Herrmann, Grand Haven; Gregory T. Wolters, Holland; Cleon C. Morgan, Holland, all of Mich.

[73] Assignee: Donnelly Technology, Inc., Holland, Mich.

[21] Appl. No.: 268,197

[22] Filed: Jun. 29, 1994

Related U.S. Application Data

[62] Division of Ser. No. 665,661, Mar. 7, 1991, Pat. No. 5,362,145.

[51] Int. Cl.⁶ ............................................. F25D 11/00
[52] U.S. Cl. .................................... 312/408; 211/187; 108/107
[58] Field of Search ............... 312/116, 408, 410, 236; 211/187, 153, 134, 207; 108/107, 108

[56] References Cited

U.S. PATENT DOCUMENTS

| | | |
|---|---|---|
| D. 295,950 | 5/1988 | Johnston . |
| 392,061 | 10/1888 | Peckham . |
| 786,935 | 4/1905 | Wright . |
| 870,439 | 11/1907 | Kade . |
| 907,423 | 12/1908 | Tilley . |
| 1,119,982 | 5/1914 | Ohnstrand . |
| 1,805,584 | 5/1931 | Kemp . |
| 1,878,072 | 9/1932 | Vance . |
| 2,169,295 | 8/1939 | Shuart . |
| 2,197,982 | 4/1940 | O'Brien . |
| 2,252,997 | 8/1941 | Vanderveld . |
| 2,505,322 | 4/1950 | Drake . |
| 2,517,725 | 8/1950 | Schweller . |
| 2,537,804 | 1/1951 | Watkins . |
| 2,568,153 | 9/1951 | Hickman . |
| 2,599,607 | 6/1952 | Burrise . |
| 2,604,375 | 7/1952 | Beckett . |
| 2,613,818 | 10/1952 | Richard . |
| 2,626,773 | 1/1953 | Backman . |
| 2,657,894 | 11/1953 | Sklenar . |
| 2,681,786 | 6/1954 | Sparring . |
| 2,689,778 | 9/1954 | Chambers et al. . |
| 2,735,741 | 2/1956 | Laben . |
| 2,739,777 | 3/1956 | Schoenhardt . |
| 2,876,910 | 3/1959 | Morton, Jr. . |
| 2,949,193 | 8/1960 | Mather . |
| 2,954,125 | 9/1960 | Husted . |

(List continued on next page.)

FOREIGN PATENT DOCUMENTS

| | | |
|---|---|---|
| 327933A2 | 8/1989 | European Pat. Off. . |
| 0507455A2 | 10/1992 | European Pat. Off. . |
| 2111257 | 6/1972 | France . |
| 2660740 | 10/1991 | France . |
| 2663112 | 12/1991 | France . |
| 8535795 | 3/1986 | Germany . |
| 9006513 | 9/1990 | Germany . |
| 9011291 | 11/1990 | Germany . |
| 9004180 | 9/1991 | Germany . |
| 320487 | 11/1929 | United Kingdom . |
| 1002175 | 8/1965 | United Kingdom . |

*Primary Examiner*—Kenneth J. Dorner
*Assistant Examiner*—Gerald A. Anderson
*Attorney, Agent, or Firm*—Price, Heneveld, Cooper, DeWitt & Litton

[57] ABSTRACT

A molded refrigerator shelf useful for containment of spills on the shelf includes a planar shelf member with a rim molded around the perimeter edge of the shelf member to form a liquid tight seal between the rim and the shelf member. The molded rim projects above the top surface of the shelf member to form a liquid dam for containing spills to the shelf member. In one form, the shelf is slideably mounted to allow horizontal extension of the shelf and convenient access to the rear portion of the shelf using slide guides molded into the rim along each side of the shelf. The shelf is cantilevered upon support brackets from the rear wall of a refrigerator to allow air flow around the shelf sides. The support brackets are adapted to support the shelf at a plurality of vertical positions.

19 Claims, 5 Drawing Sheets

U.S. PATENT DOCUMENTS

| | | |
|---|---|---|
| 3,028,638 | 4/1962 | Goellner . |
| 3,082,880 | 3/1963 | Mapson . |
| 3,092,047 | 6/1963 | Chesley . |
| 3,102,499 | 9/1963 | Shelor . |
| 3,120,077 | 2/1964 | Stoffel . |
| 3,127,146 | 3/1964 | Fisher . |
| 3,185,315 | 5/1965 | Andreassen . |
| 3,212,836 | 10/1965 | Johnson . |
| 3,220,364 | 11/1965 | Sandin . |
| 3,224,081 | 12/1965 | Richter . |
| 3,270,404 | 9/1966 | Andreassen . |
| 3,331,646 | 7/1967 | Peters . |
| 3,352,431 | 11/1967 | Smith . |
| 3,363,390 | 1/1968 | Crane et al. . |
| 3,429,628 | 2/1969 | Laszlo . |
| 3,446,361 | 5/1969 | Douty . |
| 3,561,714 | 2/1971 | Zurawski et al. . |
| 3,575,484 | 4/1971 | Kesling . |
| 3,603,274 | 9/1971 | Ferdinand et al. . |
| 3,604,669 | 9/1971 | Asher . |
| 3,633,983 | 1/1972 | Whitcomb . |
| 3,672,624 | 6/1972 | Keller . |
| 3,862,784 | 1/1975 | Heinrich . |
| 3,912,085 | 10/1975 | Cooke et al. . |
| 3,984,163 | 10/1976 | Boorman, Jr. et al. . |
| 4,015,543 | 4/1977 | Stankowitz . |
| 4,072,340 | 2/1978 | Morgan . |
| 4,139,234 | 2/1979 | Morgan . |
| 4,167,259 | 9/1979 | Bury . |
| 4,174,486 | 11/1979 | Winkler . |
| 4,242,848 | 1/1981 | Schoultz . |
| 4,543,283 | 1/1985 | Curtze et al. . |
| 4,627,201 | 12/1986 | Hamamoto et al. . |
| 4,712,341 | 12/1987 | Harris, Jr. et al. . |
| 4,723,809 | 2/1988 | Kida et al. . |
| 4,735,470 | 4/1988 | Falk . |
| 4,736,918 | 4/1988 | Bessinger . |
| 4,822,656 | 4/1989 | Hutter, III . |
| 4,841,698 | 6/1989 | Gold . |
| 4,870,907 | 10/1989 | McKee . |
| 4,923,260 | 5/1990 | Poulsen . |
| 4,934,541 | 6/1990 | Bussan et al. . |
| 4,936,641 | 6/1990 | Bussan et al. . |
| 4,938,442 | 7/1990 | Mastrodicasa . |

MOLDED REFRIGERATOR SHELF

This is a division of U.S. patent application Ser. No. 07/665,661, filed Mar. 7, 1991, now U.S. Pat. No. 5,362,145.

BACKGROUND OF THE INVENTION

This invention relates to shelving for refrigerators and the like.

As is the nature of articles containing liquid which are stored in a refrigerator or freezer, many such articles are spillable and do spill. Such a spill will typically soak into other items or contaminate other foods in the refrigerated compartment. Extensive clean up efforts are required since the spill will commonly flow down through the compartment from shelf to shelf. Therefore, it is desirable to provide containment measures for limiting the area of such a spill. One such method is a spill resistant shelf, having the purpose of containing a spill to the shelf upon which the spill occurred and precluding the downward flow of the spill through the compartment.

One such spill resistant shelf is disclosed in U.S. Pat. No. 4,934,541, entitled "REFRIGERATOR SHELF AND METHOD OF MANUFACTURING" and issued on Jun. 19, 1990 to Bussan et al. therein, a refrigerator shelf is disclosed having a two-piece plastic "picture frame" circumscribing the periphery of a glass plate to provide a spill resistant refrigerator shelf. For liquid spill resistance, a silicone seal should be provided between the upper frame member and the glass plate, as disclosed.

In U.S. Pat. No. 3,633,983, entitled "SHELF STRUCTURE" and issued on Jan. 11, 1972 to Whitcomb, the use of a glass shelf member which is framed by spaced parallel side portions, an interconnecting rear portion and a transversely extending portion across the front of the glass is disclosed. The framing front, side and rear portions are specified as being extruded material and having a glass receiving groove for receiving the glass shelf member. However, a liquid tight seal around the perimeter edge of the glass is not provided or suggested. A spill on the shelf, particularly of a liquid, will seep between the glass and the supporting frame and flow down through the compartment.

Another problem common to the above discussed shelf structures still remains. That is, items which are spilled upon such shelves can seep between the glass plate shelf member and the surrounding frame members where it is virtually impossible to remove or otherwise clean. Thus and in spite of the sanitary benefits of using glass, an unsanitary condition can easily develop as food stuffs become trapped between the shelf members and frame members of the above described shelf structures.

Another consideration in designing shelf structures for a refrigerated compartment is the circulation or convection of air through the compartment. It is desirable to provide for some means of circulation in order to maintain a homogeneous temperature distribution and avoid stratification, wherein a range of temperature zones would be experienced in the compartment with the coldest zone at the bottom and the warmest zone at the top. Therefore, one will typically design the shelf structure to include passage spaces at either side of a shelf as well as behind the shelf. This carries with it an inherent deficiency in that it decreases the shelf surface area by the amount of space allowed at either side of and behind the shelf. Further, in situations where a framing structure circumscribes the shelf, such as those discussed above, the width of the frame further reduces the available shelf area.

SUMMARY OF THE INVENTION

Accordingly, the present invention provides a refrigerator shelf having a molded, perimeter, spill resistant rim. The molded rim both maximizes the spill retention capability of the shelf and minimizes the potential for inaccessible entrapment of a spilled material between the perimeter rim and the shelf member. In one aspect of the invention, the perimeter rim is molded around at least a portion of supporting shelf brackets, assuring a secure and durable attachment between the shelf member and the support brackets.

In an alternative embodiment of the invention, the shelf is provided with a slide mount so that the shelf can conveniently be extended for easier access to items stored on the rear portion of the shelf. In another aspect of the invention, a stop is provided to prevent the sliding shelf from sliding beyond a safe extension position. In another aspect of the invention, tempered glass is used as the shelf member to enhance light distribution through the refrigerated compartment and to enhance viewing of items supported by the shelving. In another aspect of the invention, the sides and back of the shelf are spaced from the walls of the refrigerated compartment to provide proper circulation around the shelf and the use of the molded perimeter rim allows the formation of a narrow perimeter rim to maximize the support area of the shelf.

The present invention provides a durable support rim for a spill proof refrigerator shelf. The molded perimeter rim maximizes sealing contact between the rim and the shelf member for enhanced spill prevention and to minimize the potential for entrapment of food stuffs between the perimeter rim and the shelf member and the subsequent development of an unsanitary condition. Further, the molded rim of the present invention offers enhanced aesthetics by minimizing seams and joints in the rim to give a more streamlined appearance.

These and other objects, advantages and features of the present invention will become apparent upon review of the following specification in conjunction with the drawings.

DESCRIPTION OF THE PREFERRED EMBODIMENT

Figure 1:
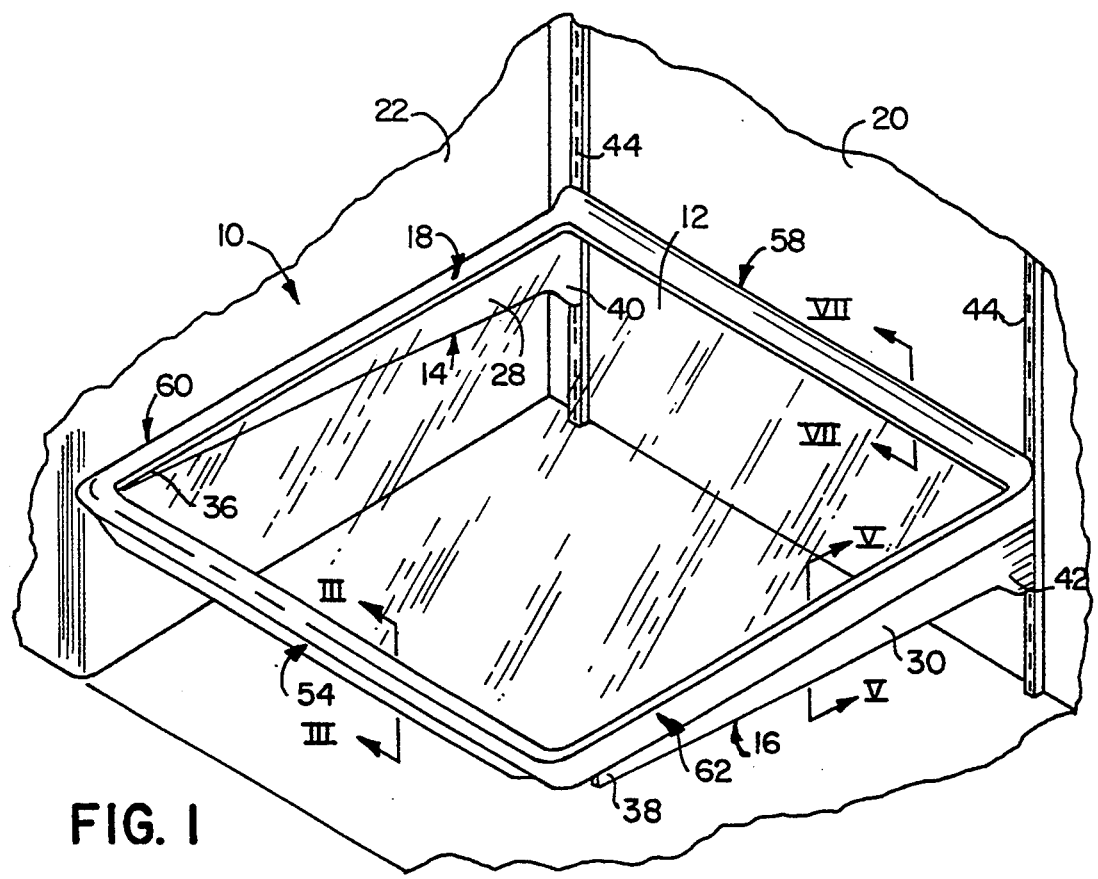
FIG. 1 is a fragmentary perspective view of the interior of a refrigerator showing a shelf according to the present invention.

Referring now to the drawings in greater detail and FIG. 1 in particular, a refrigerator shelf assembly 10 according to the present invention comprises a generally planar shelf member 12, metal support brackets 14 and 16 and a molded, resinous perimeter rim 18. Shelf assembly 10 is preferably cantilevered forward by brackets 14 and 16 from the rear wall 20 of a refrigerator.

Shelf member 12 may be a light transmitting material, preferably optically clear tempered glass, to enhance light distribution through the refrigerated compartment. Shelf member 12 has a perimeter edge 22 (FIGS. 3 and 5) which is supported above brackets 14 and 16 and positioned to overlap above inwardly projecting flange portions 26 of the brackets. Flange portions 26 project inwardly toward each other at the top edge of generally vertical web portions 30 of each bracket 14 and 16. Thus, the brackets 14 and 16 are mirror image replicas of each other.

Figure 9:
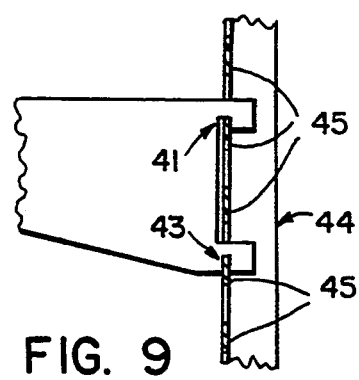
FIG. 9 is a fragmentary side elevational view showing the rear end of a support bracket.
Figure 13:
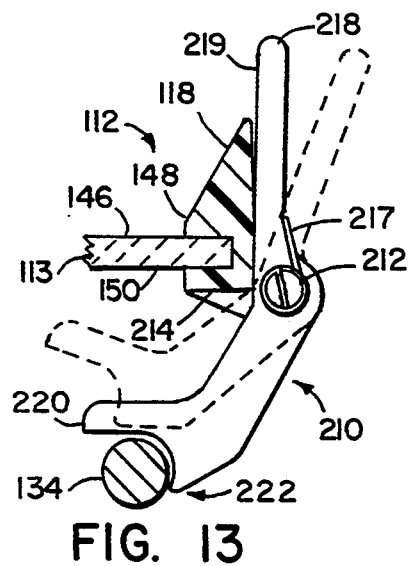
FIG. 13 is a fragmentary sectional view along section line XIII—XIII of the shelf stop of FIG. 11.
Figure 10:
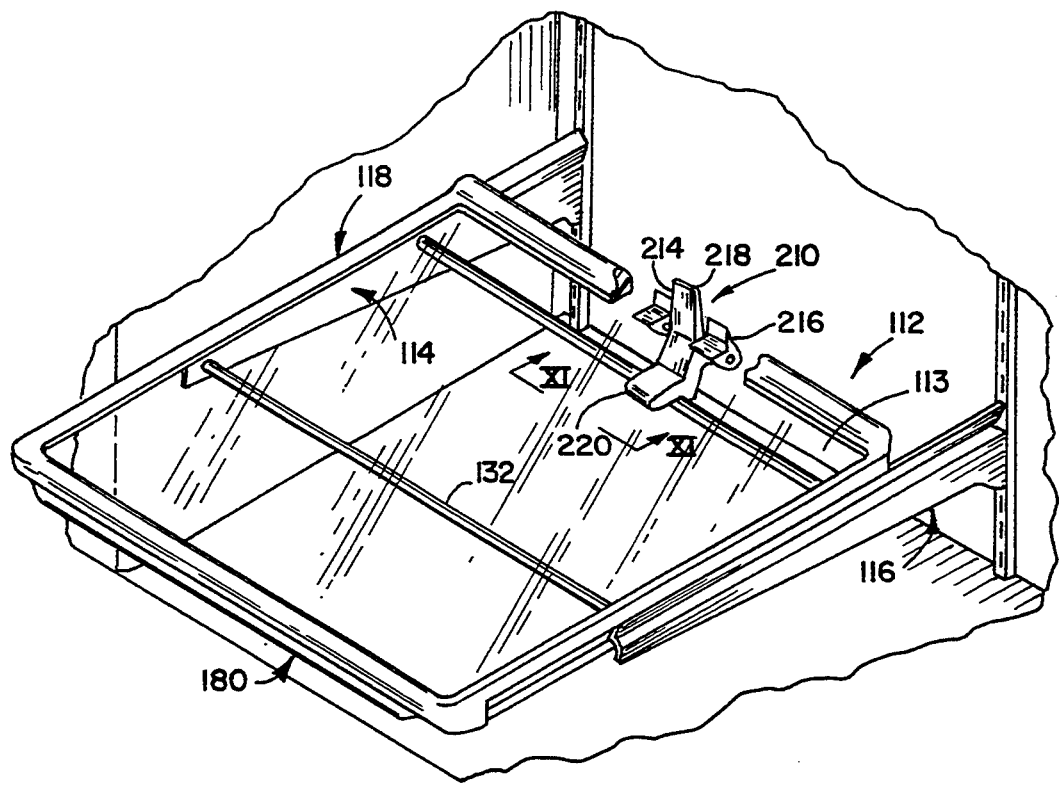
FIG. 10 is a partially fragmentary perspective view of the shelf of FIG. 2 partially extended and showing a first embodiment of a shelf stop.
Figures 11, 12:
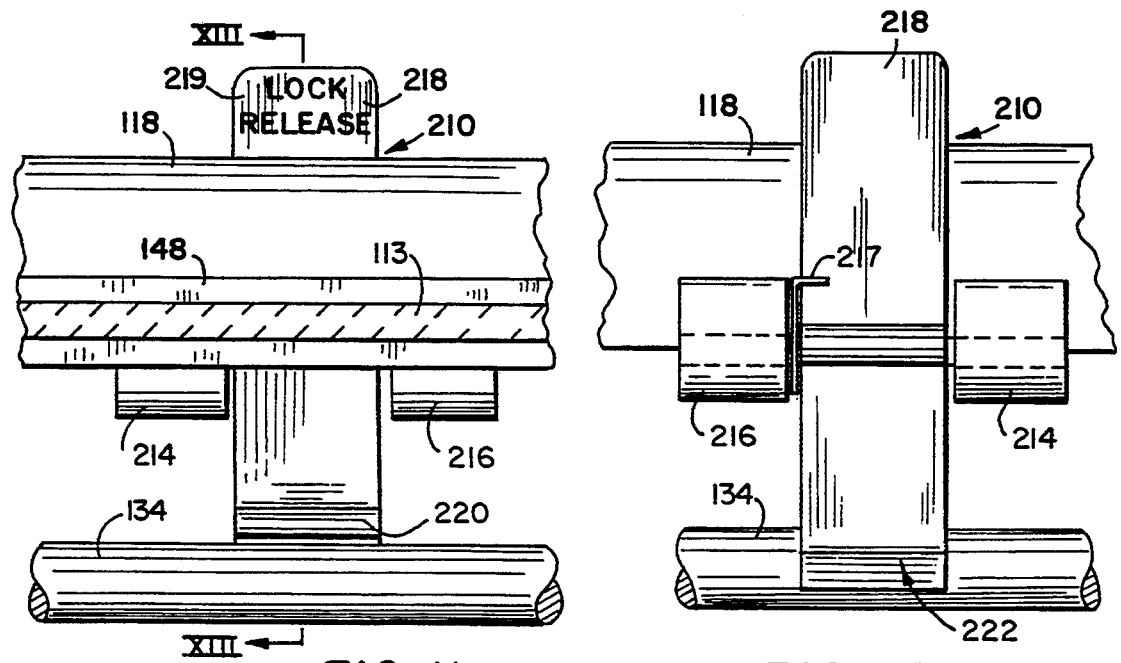
FIG. 11 is a fragmentary sectional view along section life XI—XI of the shelf stop of the shelf of FIG. 10.
FIG. 12 is a fragmentary rear elevation of the shelf stop of FIG. 11.

While shelf assembly 10 may be used as a fixed shelf, it is preferably used as a vertically adjustable shelf. Therefore, as shown in FIG. 9, the rear ends 40 and 42 of brackets 14 and 16 are preferably adapted for releasable engagement with shelf tracks 44 provided on rear wall 20 of the refrigerator as is commonly practiced.

Recesses 41 and 43 function as hooks which engage over rungs 45 in tracks 44 to suspend the brackets. Thus, shelf assembly 10 may be positioned at a plurality of locations spaced vertically along tracks 44. Shelf assembly 10 is preferably sized to provide air circulation space between side portions 60 and 62 and the side walls 22 of the refrigerator as well as between rear edge 58 and rear wall 20 of the refrigerator to provide for proper circulation around the shelf. Further, the length of shelf assembly 10 is determined to provide air circulation space between the front edge 54 and the door (not shown) of the refrigerator.

Figure 5:
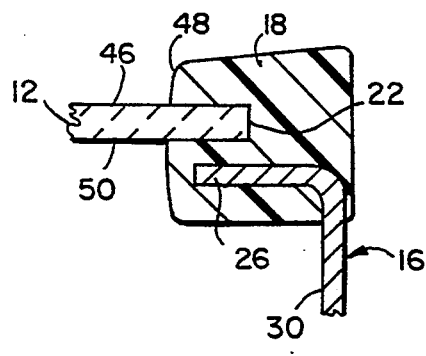
FIG. 5 is a fragmentary sectional view along section line V—V of a side edge of the shelf of FIG. 1.

Rim 18 is molded around the entire perimeter edge 22 of shelf member 12 as well as flanges 24 and 26 of brackets 14 and 16 for tight engagement and connection of shelf member 12 with brackets 14 and 16 (FIG. 5). During assembly, shelf member 12 and support brackets 14 and 16 are held and positioned within a mold while a moldable material from which rim 18 is made is injected and flows into the mold around the peripheral edge 22 of shelf member 12 and flange portions 24 and 26, encapsulating the edge 22 and flange portions 24 and 26. The moldable material of which rim 18 is comprised may include copolymer plastics such as a combination of ethylene and polypropylene or other structural, resinous plastic such as ABS or polyvinyl chloride. Further, a coloration pigment added to the moldable plastic used for molding rim 18 prior to molding to provide desired colors to the rim. For example, titanium dioxide may be added for a white coloration.

Figure 7:
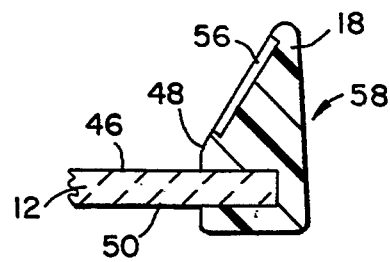
FIG. 7 is a fragmentary sectional view along section line VII—VII of the rear edge of the shelf of FIG. 1.

As the moldable material cures, i.e., cools, hardens and sets up, it becomes a tough and resilient mass extending continuously around the perimeter edge 22 of shelf member 12 for holding shelf member 12 in position above the flange portions 24 and 26 of support brackets 14 and 16. The inward extension of flanges 24 and 26 provides secure, stable support for shelf 12. Rim 18 is molded to extend above the top surface 46 of shelf member 12 and is specifically molded to define a continuous vertical wall 48 near the perimeter edge 22 of shelf member 12 forming a spill dam for containing spills occurring upon the shelf member 12 (FIGS. 3, 5 and 7).

While the seal formed between rim 18 and shelf member 12 by molding rim 18 around shelf member 12 performs quite satisfactorily, depending on the specific resinous plastic chosen, one may wish to enhance the seal by coating perimeter edge 22 and the adjoining top 46 and bottom 50 surfaces of shelf member 12, adjacent perimeter edge 22, prior to the molding of rim 18 therearound with a primer layer or coating of a heat activatable, resinous material which promotes and facilitates the adhesion of the rim material to the glass shelf member 12.

Figure 3:
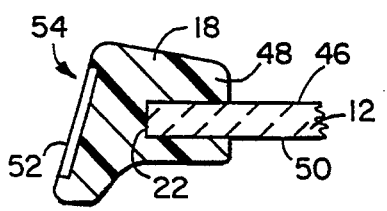
FIG. 3 a fragmentary sectional view along section line III—III of the front edge of the shelf of FIG. 1.

As shown in FIG. 3, a decorative trim piece 52 may be molded into rim 18 along the front edge 54 of shelf member 12. Likewise, a decorative trim piece 56 may be molded into rim 18 along the rear edge 58 of shelf member 12 (FIG. 7).

Figure 2:
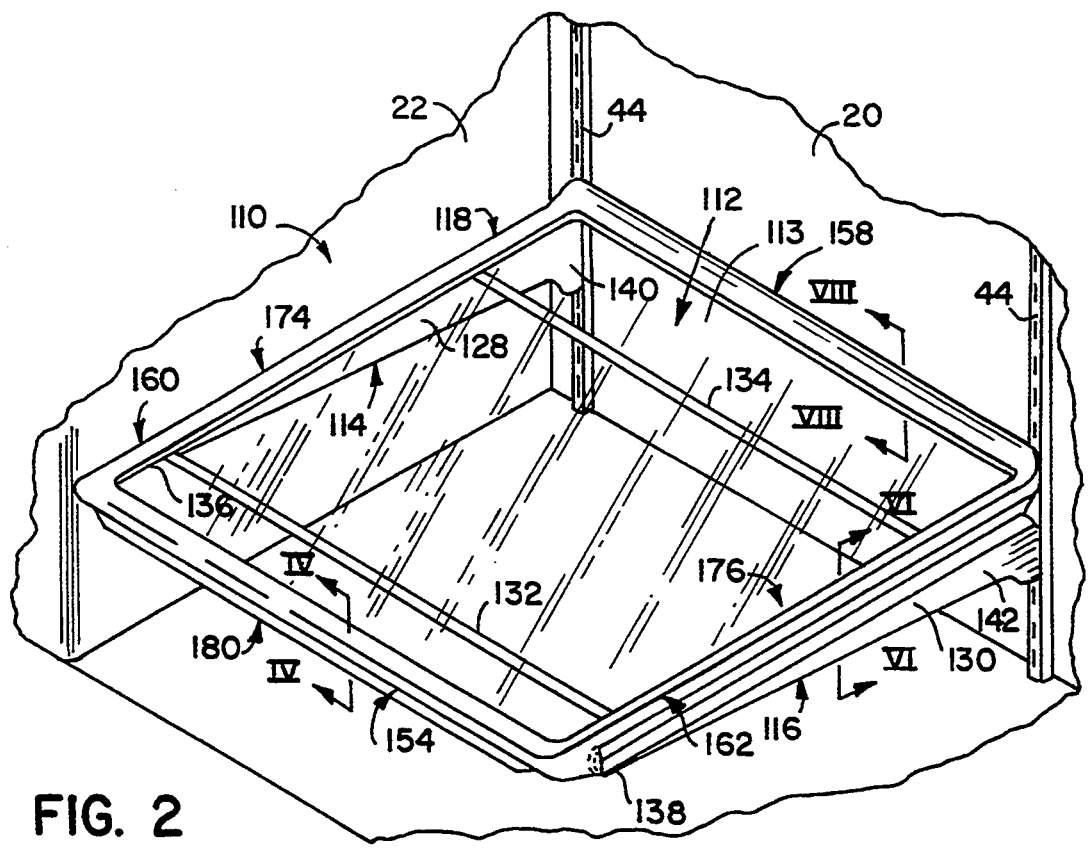
FIG. 2 is a fragmentary perspective view of the interior of a refrigerator showing a sliding shelf according to the present invention.

Alternatively, a slideable shelf assembly 110, according to the present invention, is shown in FIG. 2 comprising a slideable shelf member 112, metal support brackets 114 and 116, and a molded, resinous perimeter rim 118. Shelf assembly 110 is also preferably cantilevered forward by brackets 114 and 116 from the rear wall 20 of a refrigerator.

Figure 6:
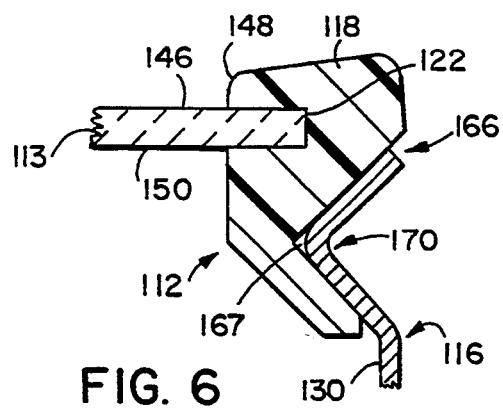
FIG. 6 is a fragmentary sectional view along section line VI—VI of a side edge of the shelf of FIG. 2.

Shelf member 112 comprises a generally planar shelf panel 113 and rim 118. Shelf panel 113 may be a light transmitting material, preferably optically clear tempered glass, to enhance light distribution through the refrigerated compartment. Shelf panel 113 has a perimeter edge 122 which is encapsulated by perimeter rim 118 (FIG. 6).

Figure 8:
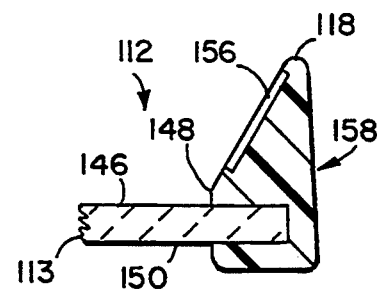
FIG. 8 is a fragmentary sectional view along section line VIII—VIII of the rear edge of the shelf of FIG. 2.

Rim 118 is molded around the perimeter edge 122 of shelf panel 113. During assembly, shelf panel 113 is held in position within a mold while a moldable material is injected and flows into the mold around perimeter edge 122. Again, the moldable material may be a copolymer plastic or other structural plastic. Also, a coloration pigment, as discussed above, may be added to the plastic used for molding rim 118. Rim 118 is also molded to extend above the top surface 146 of shelf panel 113 and is specifically molded to define a continuous vertical wall 148 near the perimeter edge 122 of shelf panel 113 forming a spill dam for containing spills occurring upon the shelf member 112 (FIGS. 4, 6 and 8).

The seal between rim 118 and shelf panel 113 may be enhanced by coating perimeter edge 122 and the top 146 and bottom 150 surfaces of shelf panel 113 near perimeter edge 122 with a primer layer of a heat activatable, resinous material as described above.

Figure 4:
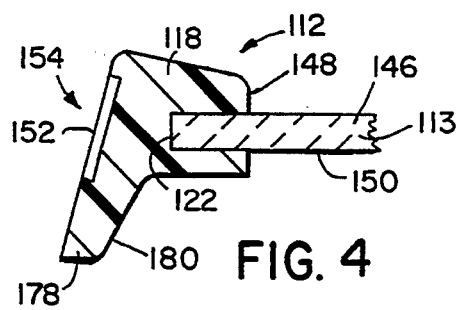
FIG. 4 is a fragmentary sectional view along section line IV—IV of the front edge of the shelf of FIG. 2.

A shelf pull 180 is molded along the front edge 154 of shelf member 112 by extending the lower edge 178 of rim 118 downwardly (FIG. 4). Further, as shown in FIG. 4, a decorative trim piece 152 may be molded into rim 118 along the front edge 154 of shelf member 112. A decorative trim piece 156 may also be molded into rim 118 along the rear edge 158 of shelf member 112 (FIG. 8).

As is best seen in FIGS. 2 and 6, a generally V-shaped channel is preferably molded into the outwardly facing side surface of each side portion 160 and 162 of rim 118 to define slide guides 166. A corresponding, generally V-shaped ridge 167 is formed along the top edges 126 of each support bracket 114 and 116 defining slide rails 170 for sliding engagement with the slide guides.

The support brackets 114 and 116 of shelf assembly 110 are mirror image replicas of each other, having rear ends 140 and 142 identical to bracket ends 40 and 42 of brackets 14 and 16, and preferably adapted for releasable engagement with shelf tracks 44. Tracks 44 are provided on rear wall 20 of the refrigerator as is commonly practiced for vertically adjustable shelf positioning of the shelf assembly 110 along tracks 44. A pair of cross braces 132 and 134 connecting between webs 128 and 130 of support brackets 114 and 116 are provided for holding the support brackets in spaced relation to each other. Brace 132 is connected to each web 128 and 130 near the forward ends 136 and 138 of brackets 114 and 116. Brace 134 is connected to each web 128 and 130 at a position approximately one-third to one-half of the length of brackets 114 and 116 forward of ends 140 and 142. Cross braces 132 and 134 are required in sliding shelf assembly 110 to stabilize the support brackets 114 and 116 and to maintain the proper positioning of front ends 136 and 138 of the brackets, precluding the front ends from spreading apart as a load is applied to the shelf assembly 110. Shelf assembly 110 also includes one of several embodiments 210, 310, 410, 510, 610 or 710 of a shelf stop to preclude the inadvertent overextension of the slideable shelf.

A first alternative embodiment of a shelf stop is shown in FIGS. 10–13 comprising a lever 210 mounted on a pivot rod 212 and a pair of pivot rod mounts 214 and 216 projecting downward from the rear edge 158 of shelf member 112, near bottom surface 150. Lever 210 has a top end 218 which projects above the perimeter rim 118 for manipulation by a user. Lever 210 also has a lower end 220 defining a catch 222 for engagement with cross braces 132 and 134. As the shelf member 112 is slid forward, the catch 222 approaches and engages the brace 134 precluding further extension of the shelf. The relative position of brace 134 controls the extension of shelf member 112 and is preferably approximately one-third to one-half the length of brackets 114 and 116 forward of ends 140 and 142. The shelf stop may be released by sliding the shelf rearward sufficiently to move catch 222 away from brace 134 and moving the lever 210 to a release position as shown in phantom in FIG. 13. Lever 210 is easily pivoted to the release position by pressing rearward on face 219 of lever 210 near its top end 218. With the lever in the release position, the catch 222 can slide above and past the brace 134. If the lever 210 is released to pass brace 134 and allowed to return to its latch position, the catch 222 will engage the other brace 132 as the shelf member 112 is extended. By keeping the lever 210 in the release position, shelf member 112 can be fully removed. A return spring 217 may be mounted with lever 210 to bias the lever to the latch position. Alternatively, lever 210 may be designed so that the force of gravity is sufficient to bias the lever to the latch position.

Figure 14:
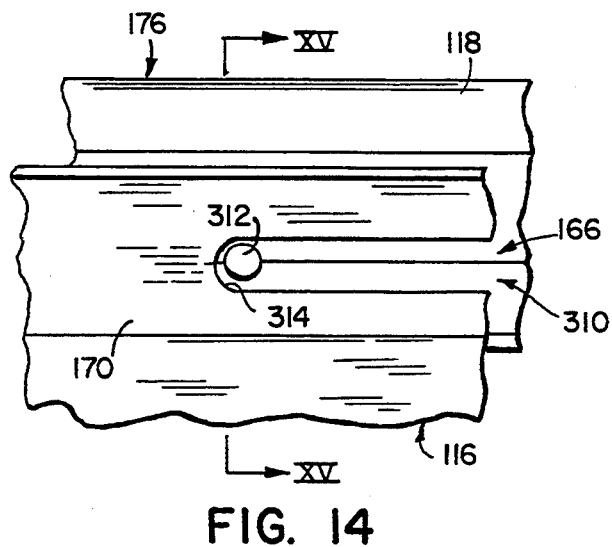
FIG. 14 is a fragmentary side elevation of the shelf of FIG. 2 showing a second, alternate embodiment of a shelf stop.
Figure 15:
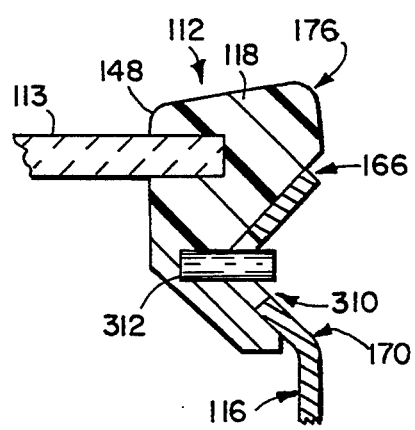
FIG. 15 is a fragmentary sectional view along section line XV—XV of the shelf of FIG. 14.

A second, alternative shelf stop embodiment is shown in FIGS. 14 and 15 comprising a slot 310 cut into at least one slide rail 168 and 170 and a cooperating stop pin 312 mounted in a fixed position and projecting from perimeter rim 118 at the corresponding slide guide 164 and 166 into the slot 310. The slot 310 has a front end wall 314 and a rear end wall (not shown) to limit the movement of pin 312 for limiting the extension and retraction of shelf assembly 110. The length and position of the slot 310 in combination with the position of the stop pin 312 will dictate the length of extension for shelf member 112, which is preferably in the range of one-third to one-half the length of the shelf support brackets 114 and 116. Use of this shelf stop embodiment generally precludes the removal of the shelf member 112 from the support brackets 114 and 116, but does not inhibit the removal of the entire shelf assembly 110 from the refrigerator compartment. Brackets 114 and 116 must be assembled to shelf member 112 with stop pins 312 received in slots 310 before mounting the entire assembly on tracks 44.

Figure 16:
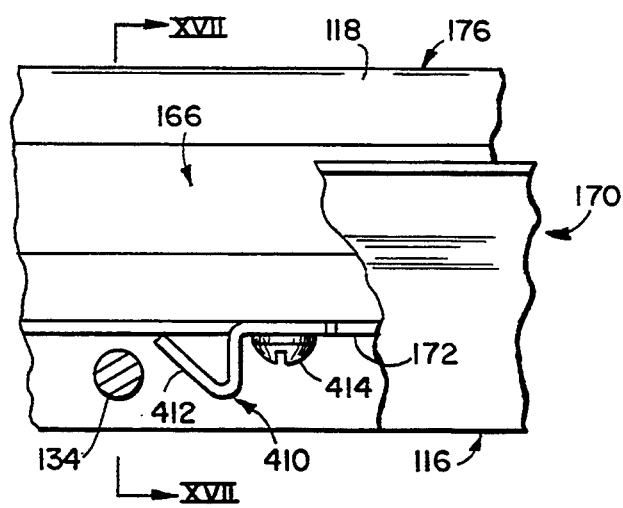
FIG. 16 is a fragmentary side elevation of the shelf of FIG. 2 with a third, alternate embodiment of a shelf stop.
Figure 17:
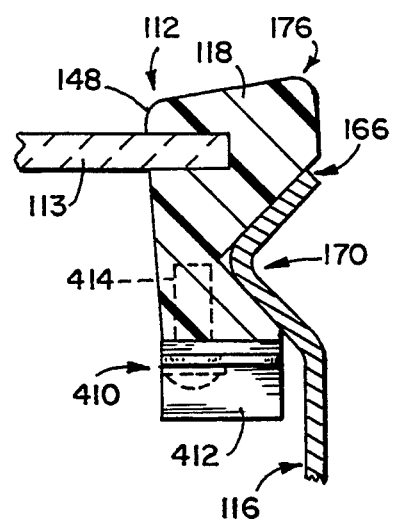
FIG. 17 is a fragmentary sectional view along section line XVII—XVII of FIG. 16.

A third, alternative embodiment of a shelf stop is shown in FIGS. 16 and 17 comprising a formed metal clip 410 mounted to the bottom surface 172 of the perimeter rim 118 along at least one side portion 174 and 176 of the rim 118. The clip 410 is configured with an inclined front abutting surface 412 for engagement with a cross brace 132 or 134 to limit the extension of the shelf member 112. The relative position of clip 410 will determine the extension of shelf member 112. Clip 410 is preferably bent from a strap of steel or formed from other resilient material so that the clip 410 will deform when forced past the cross brace and will resume its original configuration once past the cross brace. Clip 410 is preferably removably mounted to the perimeter rim 118 by a screw 414 so that it can be removed rather than requiring that it be forced past the cross brace during assembly and disassembly of the shelf assembly 110. Alternately, the shelf assembly can be removed from tracks 44 and disassembled.

Figure 18:
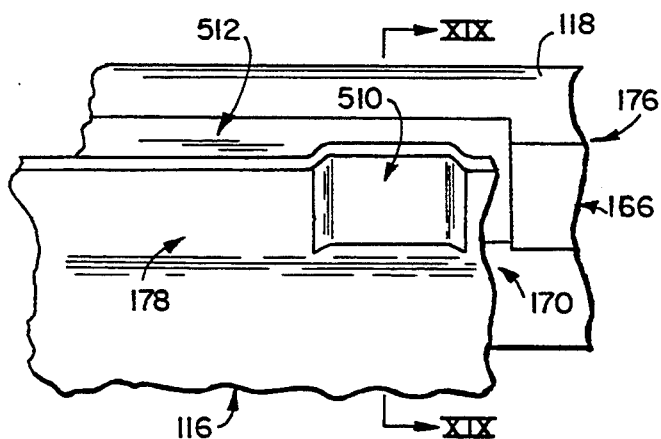
FIG. 18 is a fragmentary side elevation of the shelf of FIG. 2 showing a fourth, alternate embodiment of a shelf stop.
Figure 19:
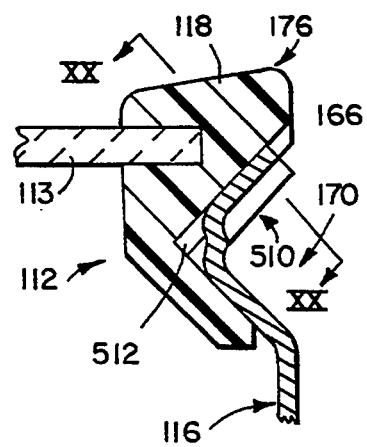
FIG. 19 is a fragmentary sectional view along section line XIX—XIX of FIG. 18.
Figure 20:
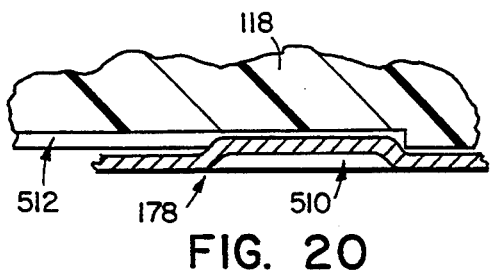
FIG. 20 is a fragmentary sectional view along section line XX—XX of FIG. 19.

A fourth, alternative embodiment of a shelf stop is shown in FIGS. 18–20 comprising a detent 510 pressed out of the side 178 of at least one of the slide rails 168 and 170 and a corresponding groove or channel 512 cut or molded into the side of the corresponding slide guide 164 and 166. The relative position of detent 510 and the relative position and length of channel 512 will control the extension of shelf member 112. Again, the brackets with slide rails 168 and 170 are assembled to shelf 112 such that detent 510 is received in channel 512 prior to mounting the entire assembly in tracks 44.

Figure 21:
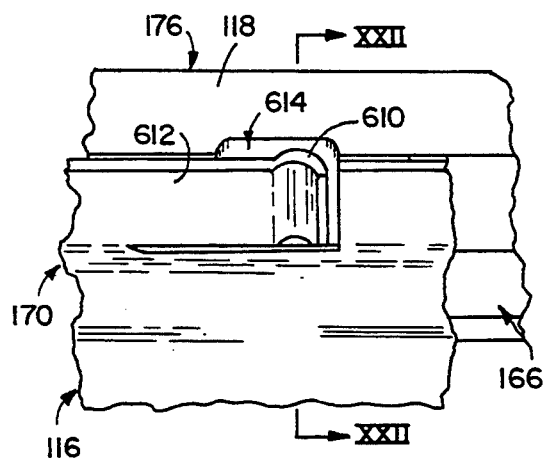
FIG. 21 is a fragmentary side elevation of the shelf of FIG. 2 showing a fifth, alternate embodiment of a shelf stop.
Figure 22:
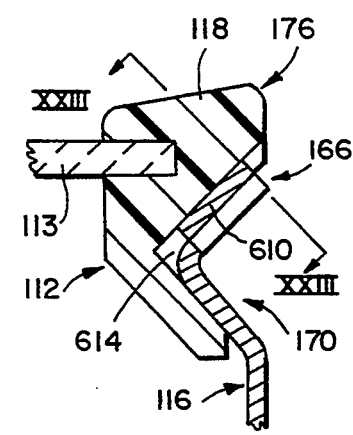
FIG. 22 is a fragmentary sectional view along section line XXII—XXII of FIG. 21.
Figure 23:
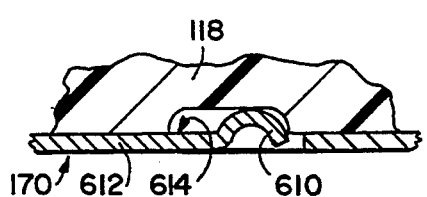
FIG. 23 is a fragmentary sectional view along section line XXIII—XXIII FIG. 22.

A fifth, alternative shelf stop is shown in FIGS. 21-23 comprising a detent 610 projecting from the end of a flexible finger 612 formed in at least one of the slide rails 168 and 170 and a notch 614 cut or molded into the side of the corresponding slide guide 164 and 166. Again, the relative positioning of the detent and notch will determine the extension of shelf member 112. Also, shelf member 112 can be removed from the support brackets 114 and 116 by forcing the notch 614 past the resilient detent 610.

Figure 26:
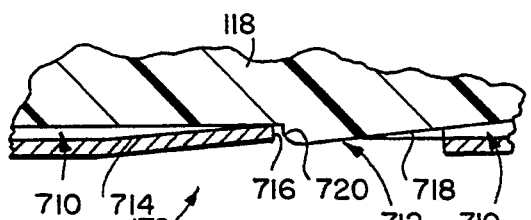
FIG. 26 is a fragmentary sectional view along section line XXVI—XXVI of FIG. 25.
Figure 25:
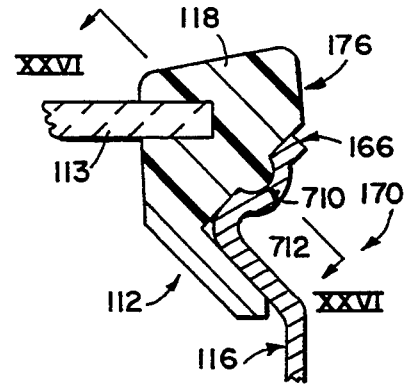
FIG. 25 is a fragmentary sectional view along section line XXV—XXV of FIG. 24.
Figure 24:
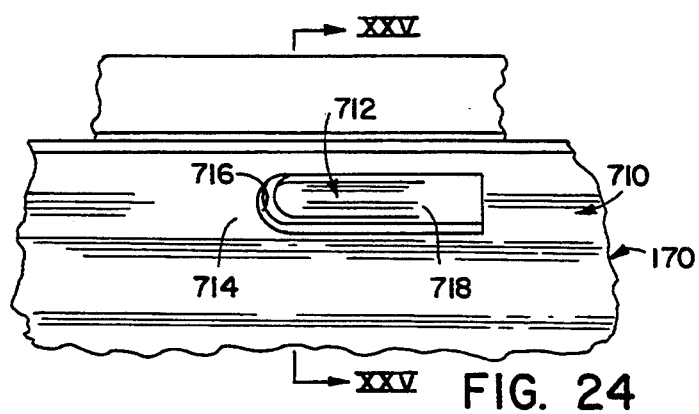
FIG. 24 is a fragmentary side elevation of the shelf of FIG. 2 showing a sixth, alternate embodiment of a shelf stop.

A sixth, alternative shelf stop embodiment is shown in FIGS. 24-26 comprising a groove 710 formed in at least one of slide rails 168 and 170 and a cooperating protrusion 712 formed on the corresponding slide guide 164 and 166. An inclined camming surface 714 with an end wall 716 projecting into the groove 710 is formed over a portion of the length of the groove 710. The protrusion 712 is molded with a cooperating inclined camming surface 718 and upstanding end wall 720 so that the shelf member 112 can be assembled by sliding the shelf member 112 into the front ends 140 and 142 of support brackets 114 and 116 and forcing protrusion 712 past the stop wall 716 in the groove. The perimeter rim 118 material of which the protrusion 712 is formed is sufficiently flexible and resilient so that protrusion 712 will deform as its camming surface 718 engages and slides over the camming surface 714 of the rail groove 710 and will resume its undeformed configuration once end wall 720 is past the stop end wall 716. Removal of shelf member 112 must be accomplished by removal of the entire assembly from tracks 44 followed by removing brackets 114 and 116 from the slide rails 168 and 170.

While alternative embodiments of the invention have been shown and described, other forms will now be apparent to one skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A shelf for use in a refrigerated compartment comprising:
   a shelf member having a top surface that receives and supports a separate article set thereupon, said shelf member also having a perimeter edge;
   a support supporting said shelf member; and
   a rim formed from a moldable material and formed around said perimeter edge and at least a portion of said support, said shelf member and said support being secured together by said rim.

2. The shelf as defined in claim 1 wherein a liquid tight seal is formed between said rim and said shelf member and wherein said rim projects above said top surface to contain any spilled material disposed upon said top surface.

3. The shelf as defined in claim 2 wherein said shelf member comprises tempered glass and wherein said liquid tight seal is enhanced by a primer layer applied to said shelf member, between said shelf member and said rim.

4. The shelf as defined in claim 1 wherein said shelf member comprises a light transmitting material.

5. The shelf defined in claim 4 wherein said shelf panel comprises tempered glass.

6. The shelf as defined in claim 2 wherein said support includes at least one bracket cantilevered from a wall of a refrigerated compartment.

7. The shelf as defined in claim 6 wherein said bracket is removably connected with the wall of a refrigerated compartment and wherein the wall removably receives said bracket at a plurality of vertically spaced positions so said bracket and shelf are cantilevered from the wall at one of a plurality of vertical locations.

8. A refrigerator comprising:
   a compartment;
   a support mounted inside compartment;
   a shelf panel supported by said support, said panel having a perimeter edge; and
   a rim formed separately from said shelf panel, said rim encapsulating at least a portion of each of said perimeter edge and said support, said shelf panel and said support being secured together by said rim.

9. The refrigerator defined in claim 8 wherein said rim is formed from a moldable material.

10. The refrigerator defined in claim 9 wherein said rim is a one piece member surrounding said shelf panel at said perimeter edge and extending above a top surface of said shelf panel to contain any spilled material disposed upon said top surface.

11. The refrigerator as defined in claim 10 wherein said shelf member comprises one of a light transmitting material and tempered glass.

12. The refrigerator as defined in claim 11 also including a wall defining a portion of said compartment; said support including at least one bracket removably connected with said refrigerator wall, said wall removably receiving said bracket at a plurality of vertically spaced positions.

13. The refrigerator defined in claim 8 wherein said rim is a one piece member surrounding said shelf panel at said perimeter edge and extending above a top surface of said shelf panel to contain any spilled material disposed upon said top surface.

14. The refrigerator as defined in claim 8 wherein said shelf member comprises one of a light transmitting material and tempered glass.

15. The refrigerator as defined in claim 8 also including a wall defining a portion of said compartment; said support including at least one bracket removably connected with said refrigerator wall, said wall removably receiving said bracket at a plurality of vertically spaced positions.

16. A refrigerator shelf for use in a refrigerator of the type having a compartment and two shelf support tracks located in the compartment on a wall of the refrigerator, the shelf comprising:
   a panel having a top surface and a perimeter edge, including a first side edge and an opposing second side edge spaced from said first side edge;
   a first support supporting said panel, said first support being positioned near said first side edge;
   a second support supporting said panel, said second support being positioned near said second side edge; and a rim surrounding said panel, said rim being a one piece member formed separately from said panel and formed around said perimeter edge and at least a portion of each of said first support and said second support, said panel, said first support, and said second support being secured together by said rim.

17. The refrigerator shelf defined in claim 16 wherein said rim is formed from a moldable material.

18. The refrigerator shelf defined in claim 16 wherein said rim extends above a top surface of said shelf panel to contain any spilled material disposed upon said top surface.

19. The refrigerator shelf as defined in claim 16 wherein said shelf member comprises one of a light transmitting material and tempered glass.

* * * * *